Nov. 22, 1966 M. O. FELIX 3,287,664
HETERODYNE MODULATOR USING A MINIMUM OF TRANSISTORS
Filed April 8, 1964
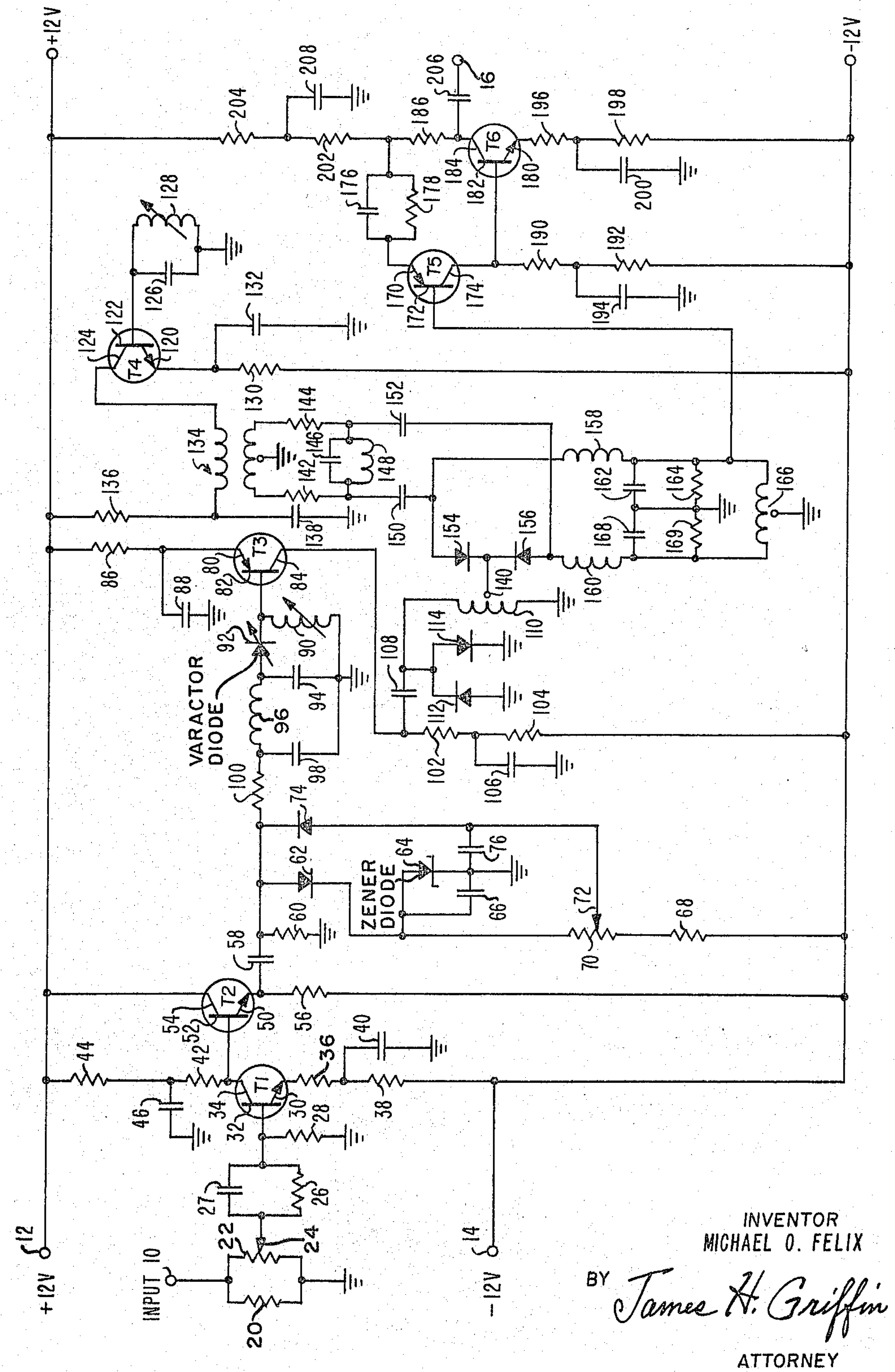
INVENTOR
MICHAEL O. FELIX
BY James H. Griffin
ATTORNEY United States Patent Office 3,287,664
Patented Nov. 22, 1966

3,287,664
HETERODYNE MODULATOR USING A MINIMUM OF TRANSISTORS

Michael O. Felix, San Carlos, Calif., assignor to Ampex Corporation, Redwood City, Calif., a corporation of California Filed Apr. 8, 1964, Ser. No. 358,324
9 Claims. (Cl. 332—23)

This invention relates in general to modulators and more particularly to a transistorized heterodyne modulator using a minimum of transistors.

Applicant's modulator circuit will be described in connection with a video tape recorder, but it is to be understood that the invention may be applied to any signal system wherein it is sought to use a transistorized heterodyne modulator, including radio and television transmitting systems and the record system of any transistorized tape recorder. In the past, magnetic tape recorder modulators have used vacuum tubes with the usual disadvantages of bulkiness and high power requirements. In transistorizing the modulator stage, it was hoped that the over-complex, over-expensive and maintenance-plagued systems of prior tape recorders could be replaced by a low cost, simple, and easy-to-maintain modulator.

It is, therefore, a general object of this invention to provide an improved heterodyne modulator.

Another object of this invention is to provide a heterodyne modulator that is transistorized.

Another object of this invention is to provide a heterodyne modulator using a minimum of components both in the basic modulator and in the amplifiers preceding and following it.

Another object of this invention is to provide a heterodyne modulator having a low level of spurious output signals, particularly the carrier second harmonic and its sidebands.

In accordance with the above objects and as a feature of applicant's invention, there is provided a heterodyne modulator circuit having one oscillator for producing a modulated carrier signal, another oscillator for producing an unmodulated carrier signal, each of the modulators having a time constant determining network, and the distinguishing characteristic that the time constant determining network of the modulated carrier oscillator is integrated with a filtering network in such a way that the modulated carrier cannot go forward of the oscillator and yet the modulating signal does not appear on the output of the oscillator.

As another feature of applicant's invention, the signals from the modulated carrier oscillator and from the unmodulated carrier oscillator are mixed in a network wherein the "push-pull" form of both carriers is maintained throughout, thus minimizing harmonic distortion. Higher harmonics are also easily removed in this arrangement by a properly designed circuit coupled between the two "push-pull" lines.

Other objects and features of this invention and a fuller understanding thereof may be had by referring to the following description and claims taken in conjunction with the accompanying drawing in which there is shown a schematic of a circuit which embodies the principles of applicant's invention.

Referring to the drawing, the circuit which is a preferred embodiment of applicant's invention has an input terminal 10, power supply terminals 12 and 14, and an output terminal 16. For purposes of illustration, the power supplies 12 and 14 are herein specified as +12 volts and −12 volts, respectively.

A resistor 20 and a variable resistor 22 are coupled between the input terminal 10 and ground, to balance any cable resistance between the television camera and the circuit herein described. A wiper 24 on the variable resistor is coupled to a "pre-emphasis" network consisting of the parallel combination of a resistor 26 and a capacitor 27 in series with a resistor 28 coupled to ground. The "pre-emphasis" network is designed to increase the voltage of higher frequency input signals. For example, in one circuit constructed according to the drawing herein, the pre-emphasis components 26, 27 and 28 were so selected that gain increased three times as the frequency increased from 200 kilocycles to 1 megacycle.

A grounded emitter amplifier transistor T1, having emitter 30, base 32, and collector 34, has its base 32 coupled to the pre-emphasis network. The emitter 30 is coupled to the power supply 14 through two resistors 36 and 38. Between the two resistors appears a decoupling capacitor 40. The collector 34 is coupled to the power supply through two resistors 42 and 44, between which a decoupling capacitor 46 is connected.

An emitter-follower transistor T2, having emitter 50, base 52, and collector 54, has its base 52 directly coupled to the collector 34 of the amplifier T1 and its collector 54 directly coupled to the positive power supply. The emitter 50 is coupled through a resistor 56 to the power supply 14. The transistor T2 performs the customary function of emitter-followers, that of impedance-matching between an amplification stage (with high output impedance) and the circuitry to follow, which would be adversely influenced by any but a low impedance source.

Following the transistor T2 is a network for maintaining the tips of the synchronous signals at a fixed D.C. voltage irrespective of the level of the video signal, this network consisting of a capacitor 58, resistor 60, diode 62, and Zener diode 64. The Zener diode 64 being a rather noisy device, is decoupled by a capacitor 66. A resistor 68 and a variable resistor 70 are coupled in series between the Zener diode 64 and the power supply 14.

A wiper 72 on the variable resistor 70 is coupled to a diode 74, which has a large capacitor 76 coupled between its anode and ground. The diode 74 has its cathode coupled to the capacitor 58 and performs the function of limiting the voltages passing into the circuitry to follow to a certain "white level" amplitude; without this, a bright light in the camera picture would produce a high voltage which the modulator would translate into a higher frequency than can be recorded. The resulting loss of playback signal would break up the reproduced picture.

A transistor T3, having emitter 80, base 82, and collector 84, is arranged with its supporting circuitry to perform as an oscillator. Thus, the emitter 80 is coupled through a resistor 86 to the power supply 12 and through a small capacitor 88 to ground. The base 82 is coupled to a network that combines the function of low-pass filtering and oscillation-time-constant determination in such manner that the video input signal does not appear on the base 82, yet the oscillator-created carrier signal does not appear at the capacitor 58. Accordingly, a variable inductance 90 coupled between the base 82 and ground will have sufficiently low impedance to short all signals in the video input frequency range to ground and yet act as part of a resonant circuit for the oscillator carrier signal, with a varactor 92 and capacitor 94 in series between the base 82 and ground providing the capacitive reactance.

The capacitor 94 is selected to function also as part of a low pass filter composed of an inductor 96, capacitor 98, varactor 92, and resistor 100, as well as being part of the resonant circuit associated with the transistor T3. The resistor 100 is coupled to the capacitor 58 in the D.C. restorer circuit; the capacitor 98 is coupled between the resistor 100 and ground; and the inductor 96 is coupled between the resistor 100 an the capacitor 94.

The output of the above-described oscillator circuit appears on the collector 84 of the transistor T3. The collector 84 is coupled to the power supply 14 through two resistors 102 and 104, having a decoupling capacitor 106 between them, and is coupled through a capacitor 108 to one end of a tapped coupling transformer 110, the other end of which is grounded. Two grounded, opposite conducting limiting diodes 112 and 114 are coupled to a point between the capacitor 108 and the transformer 110.

Another oscillator in applicant's modulator is constructed around a transistor T4, having emitter 120, base 122, and collector 124. A resonant circuit consisting of a capacitor 126 and variable inductor 128 in parallel is coupled between the base 122 and ground. The emitter 120 is coupled to the power supply 14 through a resistor 130 and is coupled to ground through a capacitor 132. The collector 124 of the transistor T4 is coupled to the primary of a push-pull transformer 134. The other end of the primary is coupled to the power supply 12 through a resistor 136 and to ground through a decoupling capacitor 138.

The secondary of the transformer 134, center-tapped to ground, is coupled to a mixer portion of applicant's circuit, as is a tap 140 on the transformer 110. Two resistors, 142, 144, are coupled to alternate ends of the secondary of the transformer 134. A resonant circuit comprising a capacitor 146 and in inductor 148 appears between the resistor 142 and the resistor 144. Two capacitors 150 and 152 are coupled in series with the resistors 142 and 144, respectively, and two diodes 154 and 156 are coupled between the capacitors 150 and 152, respectively, and the tap 140. At the junction point between the capacitor 150 and the diode 154 is coupled an inductor 158, while at the junction between the capacitor 152 and the diode 156 is an inductor 160. The inductor 158 is coupled to a capacitor 162, a resistor 164, and one end of a transformer 166, which is center-tapped to ground. The inductor 160 is coupled to a capacitor 168, a resistor 169, and the other end of the transformer 166. The capacitors 162 and 168 and the resistors 164 and 169 are all grounded.

The signal at either end of the transformer 166 may serve as the output signal of the mixer; and nothing further remains for applicant's modulator circuit but to amplify the signal therefrom to suitable amplitude for use in the circuitry to follow. Accordingly, two amplifier transistors T5 and T6, having emitters 170, 180, bases 172, 182, and collectors 174, 184, respectively, are coupled in P-N-P–N-P-N cascade, with feedback provided through the parallel combination of a capacitor 176 and a resistor 178 in series with a resistor 186 coupled between the emitter 170 and the collector 184. The collector 174 of the transistor T5 is directly coupled to the base 182 of the transistor T6 and is coupled to the power supply 14 through two resistors 190 and 192, having a decoupling capacitor 194 between them, and the emitter 180 is coupled to the power supply 14 through two resistors 196 and 198, which have a decoupling capacitor 200 coupled between them. The collector 184 is coupled through the resistor 186 and two resistors 202 and 204 to the power supply 12 and through a capacitor 206 to the output terminal 16. A decoupling capacitor 208 runs from ground to a point between the resistors 202 and 204.

In the operation of the above described circuit, there is applied to the terminal 10 a video input signal having an amplitude range of about one volt peak-to-peak and frequencies up to 4 megacycles. After passing through the pre-emphasis circuit, the signal enters the video amplification stage, where it is amplified by the transistor T1, which, being in the grounded emitter configuration, causes a phase inversion. The inverted signal next passes through the emitter-follower T2, where some current gain occurs, but not voltage amplification.

Following the video amplification stage, the signal is level-restored in the network comprising the capacitor 58, resistor 60, and diodes 62 and 64. Level restoration reduces the peak-to-peak swings of the "sync" pulse of the video signal to a leved that will not adversely affect the circuitry to follow. Therefore, the Zener diode 64 maintains a certain voltage level at the cathode of the diode 62 (in the model of the circuit described herein, the Zener voltage was −6 v.), and a normal current flow is established from ground through the resistor 60 and the diode 62 to the constant voltage cathode of the Zener diode 64. Also, a normal level charge is stored in the capacitor 58. When the "sync" is of too great amplitude, extra current flow is induced from ground through the resistor 60 and capacitor 58, causing the voltage drop across the resistor 60 to increase, thus depressing the signal level.

Following the level restoration stage, the white level limiter (the diode 74) conducts to ground through the large capacitor 76 all voltages in excess of a certain maximum white level, which may be adjusted by movement of the wiper 72.

After the white level limiter comes the combined low pass filter and resonant circuit wherein the video signal modulates a carrier signal (in the model, about 54 megacycles) produced by the oscillator circuit of the transistor T3, capacitor 88, variable inductor 90, varactor 92, and capacitor 94. The frequency modulated carrier appears on the collector 84, from which it is applied across the diode limiter (silicon diodes 112 and 114) to the transformer 110. In like manner, the oscillator built around the transistor T4 applies an unmodulated carrier to the transformer 134, this latter carrier being of far greater amplitude and of slightly different frequency than the modulated carrier (in the model, about 50 megacycles).

The two carriers mentioned above are "mixed" by a new and simple circuit wherein the unmodulated carrier is modulated across the diodes 154 and 156 by the modulated carrier while keeping both input signals and their summation (appearing on the cathodes of the diodes 154, 156) in "push-pull" form throughout—to minimize the second harmonics in the output waveform. To obtain an output having low distortion from a diode mixer it is essential that one signal be of high level (the one that switches the diodes on and off) and the other be of low level (1/5 amplitude or below) and have low distortion. The level is set by around 5:1 ratio of the transformer 110; and the distortion is reduced by tuning the transformer 110 to the 54 megacycle carrier. Even then the distortion from a single diode mixer would be too high, so a push-pull circuit is used to cancel the predominant even harmonics. The output signal from the mixer, which can be taken from either side of the transformer 166, is applied through the two-transistor (T5 and T6) R.F. amplification stage to the output terminal 16.

A heterodyne modulator in accordance with the above description and drawing was built and operated using the following components:

*Voltages*

| | |
|---|---|
| **12**—+12 volts | **14**——12 volts |

*Transistors*

| | |
|---|---|
| T1—2N706A | T4—2N706A |
| T2—2N706A | T5—2N2048 |
| T3—2N976 | T6—2N706A |

*Diodes*

| | |
|---|---|
| **62**—FD1004 | **112**—FD1004 |
| **64**—1N753A | **114**—FD1004 |
| **74**—1N270 | **154**—FD1004 |
| **92**—SC-5 | **156**—FD1004 |

*Resistors*

| | |
|---|---|
| **20**—300 | **104**—2200 |
| **22**—100 | **130**—1K |
| **26**—1K | **136**—220 |
| **28**—475 | **142**—100 |
| **36**—100 | **144**—100 |
| **38**—1500 | **164**—680 |
| **42**—680 | **169**—680 |
| **44**—100 | **178**—1500 |
| **56**—2200 | **186**—330 |
| **60**—100K | **190**—330 |
| **68**—1K | **192**—1K |
| **70**—1K | **196**—47 |
| **86**—3300 | **198**—220 |
| **100**—270 | **202**—22 |
| **102**—330 | **204**—180 |

*Capacitors* (*microfarads*)

| | |
|---|---|
| **27**—.001 | **126**—$36\times10^{-6}$ |
| **40**—200 | **132**—$27\times10^{-6}$ |
| **46**—100 | **138**—.001 |
| **58**—22 | **150**—$22\times10^{-6}$ |
| **66**—.1 | **152**—$22\times10^{-6}$ |
| **76**—.1 | **162**—$10\times10^{-6}$ |
| **88**—$27\times10^{-6}$ | **168**—$10\times10^{-6}$ |
| **94**—$100\times10^{-6}$ | **176**—.1 |
| **98**—$27\times10^{-6}$ | **194**—.1 |
| **106**—.001 | **200**—.1 |
| **108**—.001 | **206**—.1 |
| | **208**—1.0 |

*Inductors* (*michrohenries*)

| | |
|---|---|
| **96**—10 | **158**—15 |
| **148**—.15 | **160**—15 |

The circuit described above operated with the usual video signals and exhibited the following improved characteristics:

(1) Low distortion, rarely exceeding 1%;

(2) Good temperature stability, because the two similar oscillators temperature-drift together; and (3) Good frequency/voltage linearity, because of the high oscillator frequencies.

A number of alternative arrangements will readily suggest themselves to those skilled in the art. For example, N-P-N conductivity type transistors and P-N-P conductivity type transistors may be interchanged, if only the power supply, biasing elements, and other circuit components are appropriately reversed. However, although the invention has been described with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

What is claimed is:

1. A modulator circuit having a source of modulating signals, an output, a first carrier oscillator having a time constant determining network, filtering means coupling said modulating signal source to said time constant determining network such that modulated carrier output signals from said carrier oscillator cannot pass forward to the modulating signal source, means for preventing the modulating signal from appearing in the output of the carrier oscillator, a second carrier oscillator, and means for mixing the signal from the second carrier oscillator with the signal from the first carrier oscillator, said mixing means being coupled to the output.

2. A modulator circuit having a source of modulating signals, an output, a first resistor coupled to the source of modulating signals, a first capacitor coupled between the first resistor and ground, a first inductor coupled to the first resistor, a second capacitor coupled between the first inductor and ground, an active element having control and output electrodes, the control electrode of the active element being coupled through a first variable inductor to ground and through a varactor to a point between the first inductor and the second capacitor, a carrier oscillator, and means for mixing the signal from the carrier oscillator with the signal from the output electrode of the active element, said mixing means being coupled to the output.

3. A modulator circuit having a source of modulating signals, an output terminal, a first resistor coupled to the source of modulating signals, a first capacitor coupled between the first resistor and ground, a first inductor coupled to the first resistor, a second capacitor coupled between the first inductor and ground, a transistor having an emitter, base, and collector, the emitter of the transistor being coupled through a third capacitor to ground, the base of the transistor being coupled through a first variable inductor to ground and through a varactor to a point between the first inductor and the second capacitor, a carrier oscillator, and means for mixing the signal from the carrier oscillator with the signal from the collector of the transistor, said mixing means being coupled to the output terminal.

4. A modulator circuit having a source of modulating signals, a first carrier oscillator coupled to the source of modulating signals, a first transformer operatively coupled to the carrier oscillator, a second carrier oscillator, a second transformer operatively coupled to the second carrier oscillator, first and second resistors operatively coupled to the second transformer, a resonant circuit coupled between the first and second resistors, a capacitor coupled to the first resistor, a second capacitor coupled to the second resistor, a first diode having an anode and cathode, the anode of the first diode being coupled to the first capacitor, a second diode having anode and cathode, the anode of the second diode being coupled to the second capacitor, the cathodes of the first and second diodes being joined together and operatively coupled to the first transformer, an inductor coupled to the anode of the first diode, a low pass filter coupled to the inductor, a second inductor coupled to the anode of the second diode, a second low pass filter coupled to the second inductor, a first transformer coupled between the third and second inductors, one end of the third transformer being coupled to the output terminal.

5. A modulator circuit having a source of modulating signals, a carrier oscillator operatively coupled to the source of modulating signals, a first transformer operatively coupled to the carrier oscillator, a second carrier oscillator, a second transformer operatively coupled to the second carried oscillator, first and second resistors operatively coupled to the second transformer, a resonant circuit coupled between the first and second resistors, a capacitor coupled to the first resistor, a second capacitor coupled to the second resistor, a first diode having an anode and cathode, the anode of the first diode being coupled to the first capacitor, a second diode having anode and cathode, the anode of the second diode being coupled to the second capacitor, the cathodes of the first and second diodes being joined together and operatively coupled to the first transformer, a first inductor coupled to the anode of the first diode, a second inductor coupled to the anode of the second diode, the parallel combination of a third capacitor and a third resistor coupled between the first inductor and ground, the parallel combination of a fourth capacitor and a fourth resistor coupled between the second inductor and ground, a third transformer coupled between the first and second inductors, one end of the third transformer being coupled to the output terminal.

6. A modulator circuit having a source of modulating signals, a first carrier oscillator operatively coupled to the source of modulating signals, a first transformer coupled to the first carrier oscillator, a second carrier oscillator, a second transformer coupled to the second carrier oscillator, a secondary of the second transformer being center-tapped to ground, a first resistor coupled to one end of the secondary of the second transistor, a second resistor coupled to the other end of the secondary of the second transistor, the parallel combination of a first capacitor and a first inductor coupled between the first and second resistors, a second capacitor coupled to the first resistor, a third capacitor coupled to the second resistor, a first diode having an anode and cathode, the anode of the first diode being coupled to the second capacitor, a second diode having anode and cathode, the anode of the second diode being coupled to the third capacitor, the cathodes of the first and second diodes being joined together and coupled to a tap on the first transformer, a second inductor coupled to the anode of the first diode, a third inductor coupled to the anode of the second diode, the parallel combination of a fourth capacitor and a third resistor coupled between the second inductor and ground, the parallel combination of a fifth capacitor and a fourth resistor coupled between the third inductor and ground, a third transformer center-tapped to ground and coupled between the third and fourth inductors, one end of the third transformer being coupled to the output terminal.

7. A modulator circuit having an input terminal, an output terminal, a first resistor coupled to the input terminal, a first capacitor coupled between the first resistor and ground, a first inductor coupled to the first resistor, a second capacitor coupled between the first inductor and ground, a first transistor having emitter, base, and collector, the emitter of the first transistor being coupled through a third capacitor to ground, the base of the first transistor being coupled through a first variable inductor to ground and through a varactor to a point between the first inductor and the second capacitor, the collector of the first transistor being coupled to a first transformer, a second transistor having emitter, base, and collector, the base of the second transistor being coupled to ground through the parallel combination of a fourth capacitor and a second variable inductor, and the collector of the second transistor being coupled to a primary of a second transformer, a secondary of the second transformer being center-tapped to ground, a second resistor coupled to one end of the secondary of the second transistor, a third resistor coupled to the other end of the secondary of the second transistor, the parallel combination of a fifth capacitor and a second inductor coupled between the second and third resistors, a sixth capacitor coupled to the second resistor, a seventh capacitor coupled to the third resistor, a first diode having an anode and cathode, the anode of the first diode being coupled to the sixth capacitor, a second diode having anode and cathode, the anode of the second diode being coupled to the seventh capacitor, the cathodes of the first and second diodes being joined together and coupled to a tap on the first transformer, a third inductor coupled to an anode of the first diode, a fourth inductor coupled to the anode of the second diode, the parallel combination of an eighth capacitor and a fourth resistor coupled between the third inductor and ground, the parallel combination of a ninth capacitor and a fifth resistor coupled between the fourth inductor and ground, a third transformer center-tapped to ground and coupled between the third and fourth inductors, one end of the third transformer being coupled to the output terminal.

8. A modulator circuit having an input terminal, an output terminal, a first capacitor coupled to the input terminal, a first diode coupled to the first capacitor, a variable resistor having a wiper coupled to the first diode, a second diode coupled to the first capacitor, a Zener diode coupled between the second diode and ground, a first resistor, coupled between the first capacitor and ground, a second resistor coupled to the first capacitor, a second capacitor coupled between the second resistor and ground, a first inductor coupled to the second resistor, a third capacitor coupled between the first inductor and ground, a first transistor having emitter, base, and collector, the emitter of the first transistor being coupled through a fourth capacitor to ground, the base of the first transistor being coupled through a first variable inductor to ground and through a varactor to a point between the first inductor and the third capacitor, the collector of the first transistor being coupled through a fifth capacitor to a first transformer, third and fourth diodes of opposite conductivity coupled in parallel from a point between the fifth capacitor and the first transformer to ground, a second transistor having emitter, base, and collector, the base of the second transistor being coupled to ground through the parallel combination of a sixth capacitor and a second variable inductor, and the collector of the second transistor being coupled to a primary of a second transformer, a secondary of the second transformer being center-tapped to ground, a third resistor coupled to one end of the secondary of the second transistor, a fourth resistor coupled to the other end of the secondary of the second transistor, the parallel combination of a seventh capacitor and a second inductor coupled between the third and fourth resistors, an eighth capacitor coupled to the third resistor, a ninth capacitor coupled to the fourth resistor, a fifth diode having an anode and cathode, the anode of the fifth diode being coupled to the eighth capacitor, a sixth diode having an anode and cathode, the anode of the sixth diode being coupled to the ninth capacitor, the cathodes of the fifth and sixth diodes being joined together and coupled to a tap on the first transformer, a third inductor coupled to the anode of the fifth diode, a fourth inductor coupled to the anode of the sixth diode, the parallel combination of a tenth capacitor and a fifth resistor coupled between the third inductor and ground, the parallel combination of an eleventh capacitor and a sixth resistor coupled between the fourth inductor and ground, a third transformer center-tapped to ground and coupled between the third and fourth inductors, one end of the third transformer being coupled to the output terminal.

9. A modulator circuit having an input terminal, a positive power supply terminal, a negative power supply terminal, an output terminal, a first capacitor coupled to the input terminal, a first diode coupled to the first capacitor, a variable resistor coupled to the negative power supply, a wiper on the variable resistor coupled to the first diode, a second diode having anode and cathode, the anode of the second diode being coupled to the first capacitor, a Zener diode coupled between the cathode of the second diode and ground, a first resistor coupled between the first capacitor and ground, a second resistor coupled to the first capacitor, a second capacitor coupled between the second resistor and ground, a first inductor coupled to the second resistor, a third capacitor coupled between the first inductor and ground, a first transistor having emitter, base, and collector, the emitter of the first transistor being coupled through a third resistor to the positive power supply and through a fourth capacitor to ground, the base of the first transistor being coupled through a first variable inductor to ground and through a varactor to a point between the first inductor and the third capacitor, the collector of the first transistor being coupled through a fifth capacitor to a first transformer, third and fourth diodes of opposite conductivity coupled in parallel from a point between the fifth capacitor and the first transformer to ground, a second transistor having emitter, base, and collector, the emitter of the second transistor being coupled through a fourth resistor to the negative power supply, the base of the second transistor being coupled to ground through the parallel combination of a sixth capacitor and a second variable inductor, and the collector of the second transistor being coupled to a primary of a second transformer, a secondary of the second transformer being center-tapped to ground, a fifth resistor coupled to one end of the secondary of the second transformer, a sixth resistor coupled to the other end of the secondary of the second transformer, the parallel combination of a seventh capacitor and a second inductor coupled between the fifth and sixth resistors, an eighth capacitor coupled to the fifth resistor, a ninth capacitor coupled to the sixth resistor, a fifth diode having an anode and cathode, the anode of the fifth diode being coupled to the eighth capacitor, a sixth diode having anode and cathode, the anode of the sixth diode being coupled to the ninth capacitor, the cathodes of the fifth and sixth diodes being joined together and coupled to a tap on the first transformer, a third inductor coupled to the anode of the fifth diode, a fourth inductor coupled to the anode of the sixth diode, the parallel combination of a tenth capacitor and a seventh resistor coupled between the third inductor and ground, the parallel combination of an eleventh capacitor and an eighth resistor coupled between the fourth inductor and ground, a third transformer center-tapped to ground and coupled between the third and fourth inductors, one end of the third transformer being coupled to the output terminal.

References Cited by the Examiner

UNITED STATES PATENTS

| | | | |
|---|---|---|---|
| 2,984,794 | 5/1961 | Carter et al. | 332—30 |
| 3,165,698 | 1/1965 | Friend et al. | 331—4 X |
| 3,247,465 | 4/1966 | Schucht | 332—30 |
| 3,249,897 | 5/1966 | Trilling | 332—30 |

NATHAN KAUFMAN, *Primary Examiner.*

A. L. BRODY, *Assistant Examiner.*